Figure 5:
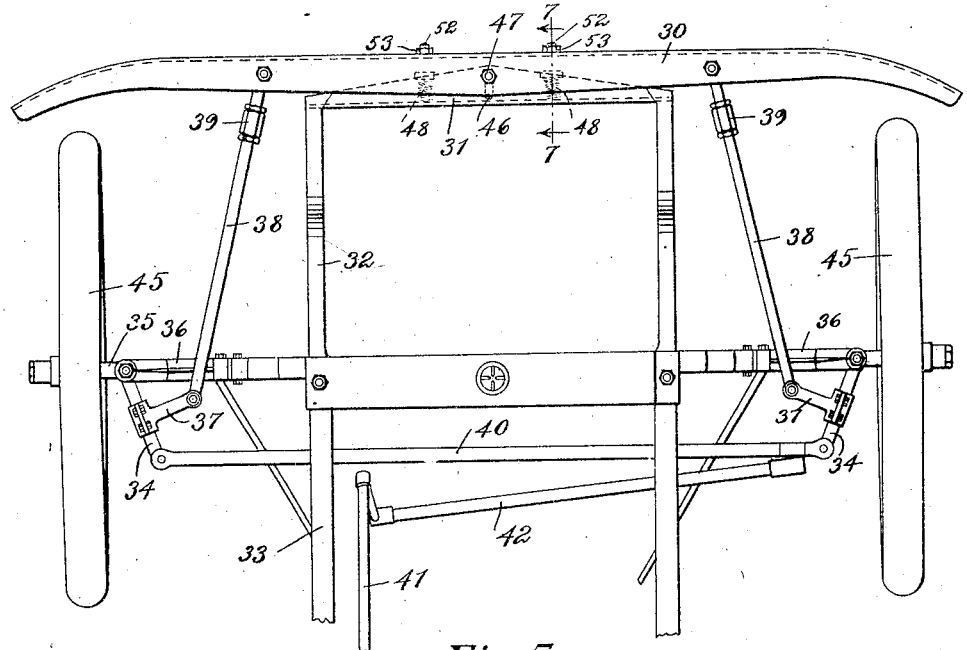

L. S. CHADWICK.
AUTOMATIC CONTROL MECHANISM FOR VEHICLES.
APPLICATION FILED AUG. 26, 1915.
1,251,639.
Patented Jan. 1, 1918.
3 SHEETS—SHEET 1.
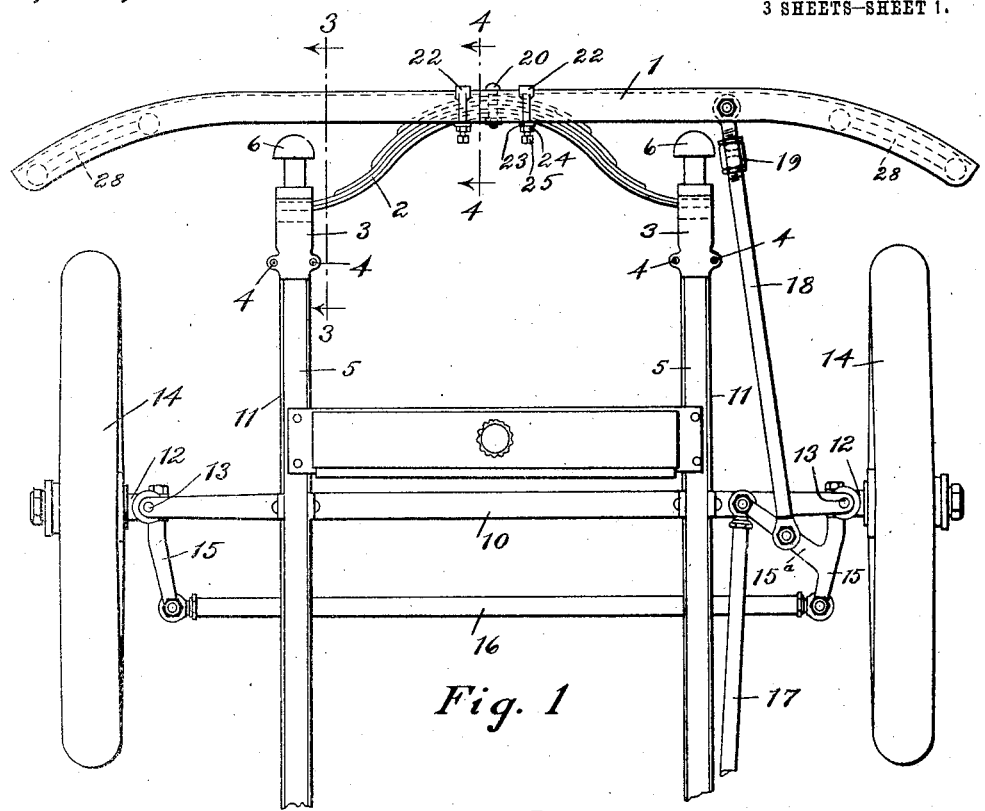
Fig. 1
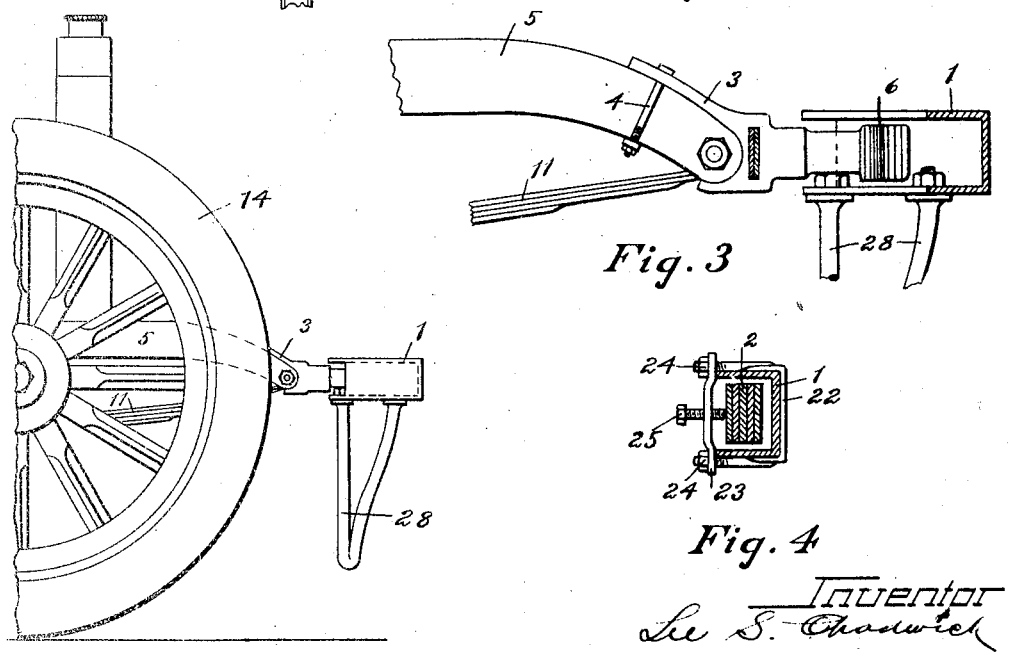
Fig. 2
Fig. 3
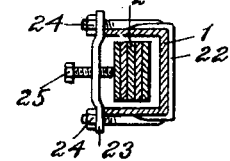
Fig. 4
Inventor
Lee S. Chadwick
By Hull Smith Brock & West
Attys L. S. CHADWICK.
AUTOMATIC CONTROL MECHANISM FOR VEHICLES.
APPLICATION FILED AUG. 26, 1915.

1,251,639.

Patented Jan. 1, 1918.
3 SHEETS—SHEET 2.

Inventor
Lee S. Chadwick
By Hull Smith Brock & West
Attys

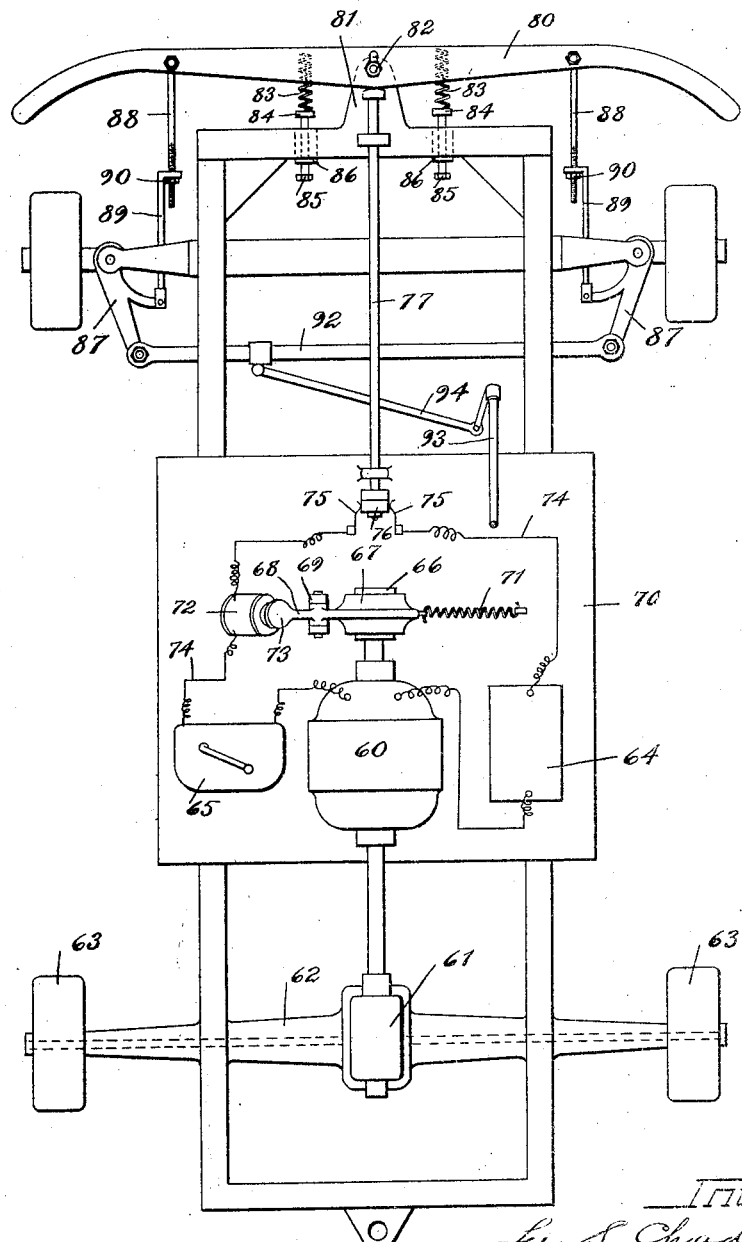

UNITED STATES PATENT OFFICE.

LEE S. CHADWICK, OF EAST CLEVELAND, OHIO.

AUTOMATIC CONTROL MECHANISM FOR VEHICLES.

1,251,639.   Specification of Letters Patent.   Patented Jan. 1, 1918.

Application filed August 26, 1915. Serial No. 47,417.

*To all whom it may concern:*

Be it known that I, LEE S. CHADWICK, a citizen of the United States, residing at East Cleveland, in the county of Cuyahoga and State of Ohio, have invented a certain new and useful Improvement in Automatic Control Mechanism for Vehicles, of which the following is a full, clear, and exact description, reference being had to the accompanying drawings.

This invention relates to an automatic control mechanism for vehicles, especially self-propelled vehicles; and it has for its object to provide mechanism involving a guard or bumper that is yieldingly supported from a vehicle beyond the front or advancing end thereof and that is operatively connected to either or both the propelling mechanism and steering gear of the vehicle so that upon the engagement of the bumper with an obstacle, the propelling mechanism will be rendered ineffective and the vehicle stopped, or the steering gear will be automatically actuated to divert the vehicle from its former course and avoid collision.

To better understand the utility of my invention, an example will be made of a case wherein the use of the invention would save vehicles from damage and the occupants thereof from danger of injury. Take the case of two automobilists trying to pass each other while going in opposite directions and running their machines so close together that the hubs of their front wheels engage. This is very often done, and the inevitable result is that the front wheels of each machine will be forcibly turned toward the other, regardless of the efforts of the driver to hold the steering wheel steady, and the seriousness of the accident depends upon the speed at which the machines were running.

If the hub of the front or steering wheel of a vehicle strikes any obstacle, it results in the vehicle being turned toward that obstacle, greatly increasing the damaging effect of the collision.

In the case of a self-propelled vehicle colliding with a person or another vehicle, especially a vehicle of lighter weight, before the driver can possibly get his vehicle under control, it has passed over the pedestrian or has done considerable damage to the vehicle with which it has collided.

It is the primary object of my invention, therefore, to provide control mechanism for vehicles that is actuated by a bumper, to stop or deflect the vehicle, should the bumper engage an obstacle located in the path of the vehicle.

A further and very important object of my invention is to incorporate, in the foregoing mechanism, means for normally holding the steering wheel of the vehicle in a position to guide the vehicle straight, thereby relieving the driver of the continual strain of holding his machine to the road.

Other objects are to provide an automatic control mechanism that may be readily attached to standard makes of automobiles; and that include convenient means of adjusting its spring tension, and the relative angular position of the bumper, with respect to the steering wheels.

Figure 6:
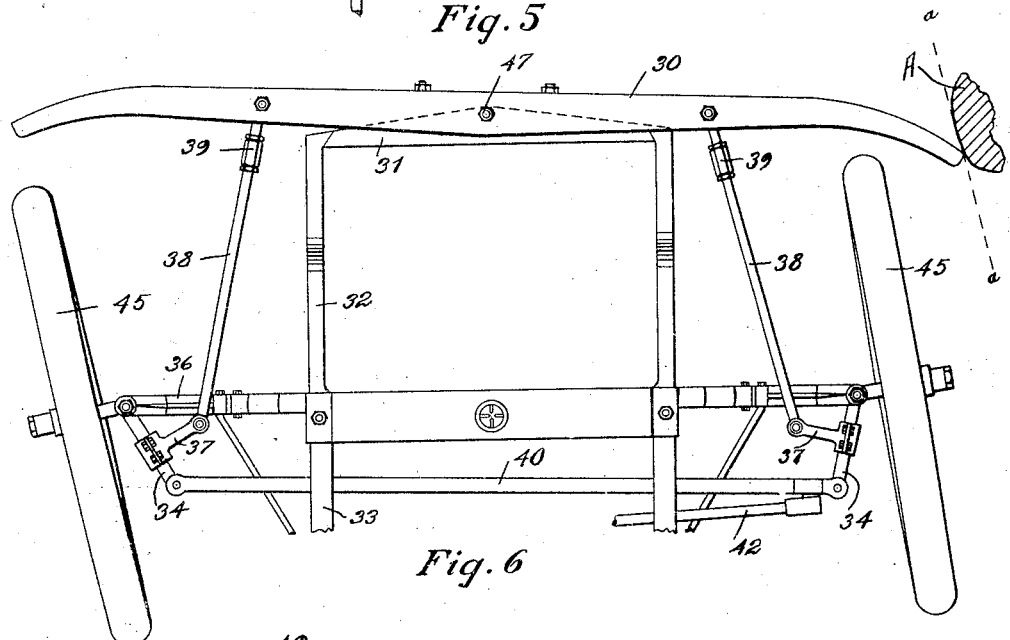
Figure 7:
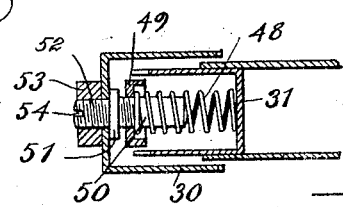

The foregoing objects, and others which will become apparent as this description proceeds, are attained in mechanism illustrated in the accompanying drawings which form a part hereof and wherein Figure 1 is a plan view of the forward part of an automobile chassis having the combined bumper and automatic steering mechanism of my invention applied thereto; Fig. 2 is a side elevation of the parts shown in Fig. 1; Fig. 3 is a section on the line 3—3 of Fig. 1, while Fig. 4 is a detail on the correspondingly numbered line of Fig. 1; Figs. 5 and 6 are views, similar to Fig. 1, of a modified form of my invention, Fig. 5 showing the mechanism in normal position, and Fig. 6, the mechanism as affected by one end of the bumper striking an obstacle; Fig. 7 is a detail on the line 7—7 of Fig. 5; and Fig. 8 is a diagrammatic representation of a self-propelled vehicle equipped with my control mechanism, in this embodiment of my invention the mechanism serving to divert the machine from its course should the end of the bumper engage an obstruction, while the same will act to automatically stop the vehicle, should the bumper strike an obstruction at about its middle.

In the form of the invention shown in

Figs. 1 to 4, the bumper 1 is supported beyond the forward end of the vehicle by a semi-elliptic spring 2, which has its ends mounted in brackets 3 that are clamped, by bolts 4, to the forward ends of the side rails 5 of the vehicle frame or chassis. Forward beyond the ends of the spring 2, the brackets 3 are provided with stops 6 which limit the rearward movement of the end portions of the bumper.

10 represents the front axle of the vehicle by which is supported, through the intervention of the springs 11, the frame or chassis. According to the usual construction of vehicles of the nature herein shown, the steering knuckles 12 are journaled on vertical axes shown at 13, to the outer ends of the axle 10. The steering knuckles have spindles whereon the forward or steering wheels 14 of the vehicle are mounted, and each knuckle has a rearwardly extending arm 15, the arms of the opposed knuckles being connected by the knuckle bar 16. The arm 15 that is located on the right hand side of the vehicle has a branch 15ª which extends inwardly and forwardly therefrom and has pivoted to its inner end, the end of a bar 17 that is connected to the steering apparatus. It will be readily understood that upon the reciprocation of the bar 17, the arm 15 to which it is connected will be swung to and fro and likewise the opposite arm 15, by reason of the connection between said arms through the rigid knuckle bar 16. This will result in the steering knuckles 12 being turned in opposite directions so as to properly turn the steering wheels 14 to cause them to travel in parallel or concentric paths.

The aforesaid branch 15ª is connected to the right hand end of the bumper 1, by a link 18 which consists of two sections that are connected by a turn-buckle 19 whereby the length of the link may be conveniently altered. Preferably, the bumper 1 is of channel formation, and opens toward the rear so that the central portion of the spring 2 may repose within the channel, the bumper and the spring being connected by a bolt 20 that passes through the web of the channel and through the various leaves of the spring 2. This form of connection allows a slight rocking movement between the spring and bumper. To hold the bumper rigid with the spring I employ clips 22 which are U-shaped as shown in Fig. 4, and embrace the channel, the threaded ends of the parallel branches of the clips extending beyond the rear side of the channel to receive a plate 23 that is clamped firmly against the channel by the nuts 24 that are screwed onto the threaded ends of the clips. At about its center each plate 23 has a threaded aperture for the adjusting screw 25, the inner end of which bears against the rear surface of the spring 2. By loosening one and tightening the other of the adjusting screws 25, the bumper may be rocked with respect to the spring. In adjusting the mechanism to the vehicle, the bumper may first be arranged directly straight across the front of the vehicle by the adjustment just described, and the length of the link 18 may then be altered until the steering wheels 14 are absolutely straight. It will be understood from the nature of the connection of the bumper with the vehicle frame, that any rocking movement of the bumper is resisted by the spring, and that the spring will act to return the bumper to normal position when the bumper is free to move. Consequently, when the steering wheels of the vehicle are turned from a straight course, the spring 2 will act through the bumper 1 and link 18 to "right" the wheels. The mechanism therefore acts automatically to retain the vehicle in a straight course and relieves the driver of this burden.

Depending from each end of the bumper is a guard 28, that is rigidly connected to the bumper. Preferably, this guard projects downward a sufficient distance to contact with a curb of undue height.

Now let it be presumed that the driver approaches another machine that is coming toward him so closely that, under circumstances previously set forth herein, the hubs of the vehicles would engage. With his machine equipped with my automatic steering mechanism, the end of the bumper 1 would engage the hub or wheel of the advancing vehicle thereby rocking the right hand end of the bumper rearward and through the link 18, the branch 15ª of the right hand arm 15 rearward to swing the corresponding steering knuckle 12 forward and turn the steering wheel carried thereby inward or away from the approaching vehicle, it being understood that the opposite wheel 14 and steering knuckle 12 are operated in harmony with the ones just described through the knuckle bar 16. Just as soon as the bumper 1 has cleared the other vehicle, the spring 2 will return the bumper to its normal position, and through the connection of the bumper with the steering gear will "right" the vehicle so that it will continue in its straight course. While acting as an automatic steering mechanism under conditions just described, the mechanism will also act as a shock absorbing bumper should the vehicle collide "head on" with an obstruction.

The above results will follow should one of the guards 28 strike a curb or other obstacle, and avoid the possibility of wrecking the wheels.

In the case of a self-propelled vehicle colliding with a person or another vehicle, especially a vehicle of lighter weight, before the driver can possibly get his vehicle under In Figs. 5 to 7 I have illustrated a modified form of my invention wherein the bumper 30 is pivotally connected to the cross member 31 of a frame 32 that is supported beyond the front end of the vehicle 33. In this modification each of the rearwardly extending arms 34 of the steering knuckles 35, that are pivoted to the ends of the axle 36, have clamped to them special arms 37 that are operatively connected to the bumper 30 through the adjustable links 38, having the turnbuckles 39. The rear ends of the arms 34 are connected by the knuckle bar 40, and in the present case, the steering apparatus 41 is connected to the knuckle bar by a link 42. Upon reciprocation of the link 42, the knuckle bar will be moved laterally to swing the arms 34 and steering knuckles 35 to effect the steering of the machine through the wheels 45.

The cross member 31 of the frame 32 is slotted at 46 for the accommodation of the bolt 47 whereby the bumper 30 is pivotally connected to the aforesaid frame. The bumper is retained forward with the bolt 47 occupying the front of the slot 46, by springs 48 that are interposed between the cross member 31, and followers 49 that are threaded upon bolts 50. These bolts have collars 51 that bear against the web of the channel shaped bumper 30, said bolts having threaded extensions 52 that project through apertures in the web of the bumper and receive lock nuts 53 whereby the bolts are held against turning. For the convenience of turning the bolts, their exposed ends are provided with grooves 54 for the application of a screwdriver. By turning the screws, the followers 49 are adjusted longitudinally thereof to vary the tension of the springs 48. By this means, the bumper may be rocked with respect to the frame 32 to acquire the proper normal position thereof, and the bumper may be adjusted with respect to the steering gear of the vehicle by means of the turn buckles 39.

The action of this form of my invention is exactly the same as the former modification and is illustrated in Fig. 6 where the right hand end of the bumper is shown as having engaged an obstruction A. It is shown as having turned the steering wheels of the vehicle away from the obstruction so that further advance movement of the vehicle will cause it to entirely clear the obstruction, as indicated by the dotted line a—a. After the bumper has passed the obstruction, the springs 48 will act to return it to normal position and "right" the vehicle.

In Fig. 8 I have shown diagrammatically a self-propelled vehicle or tractor that is driven by a motor 60 through the usual worm and worm gear inclosed by the casing 61 and is operatively connected to the rear axle of the vehicle which, in turn, has connection with the driving wheels 63. The batteries for supplying current to the motor 60 are shown diagrammatically at 64, and a controller for varying the speed of the motor, at 65. One end of the armature shaft is provided with a brake drum 66 that is arranged to be engaged by a brake shoe 67 that is carried by a rocking beam 68, pivoted between brackets 69 which rise from the platform 70. A spring 71 tends to apply the shoe 67 forcibly to the drum to stop the motor, but this action is resisted by an electromagnet 72, the armature of which is shown as formed by the enlarged end 73 of the rocking beam 68. The magnet 72 is included in the motor circuit so that when the circuit is closed, the brake shoe 67 is released. The circuit may be easily traced through the wires 74, and the circuit is interrupted at one place for the introduction of a pair of spring contacts 75 that are adapted to be bridged by a block contact 76 that is carried on the rear end of a reciprocable rod 77.

The forward end of the rod 77 reposes, normally, practically in contact with the rear side of the central portion of a bumper 80, that is pivotally connected to an extension 81 of the vehicle frame. The bumper is shown as slotted, where it is connected, by the bolt 82, to the extension 81, so that the bumper may be moved rearwardly. It is retained in its forward position by springs 83 that are interposed between the bumper and adjustable bearing plates 84, carried by screws 85 that are threaded through blocks 86, carried by the vehicle frame. Each end of the bumper is connected to one of the steering knuckles 87, through the sections 88 and 89 of connecting links, each section 89 being turned laterally at its forward end and perforated to receive the threaded rear end of the section 88. A nut 90 is applied to each section 88 so that, under normal conditions, when the bumper 80 is forward, the nuts 90 are in engagement with the lateral extensions of the sections 89. It will be seen from this construction that when the right hand end of the bumper 80 is forced rearwardly, the opposite end will be thrust forwardly by reason of the pivotal connection of the bumper with the vehicle frame, and this will result in the rearwardly extending arm of the left hand steering knuckle 87 being turned inward and the arm of the other steering knuckle being turned outward through the knuckle bar 92 (which, it will be observed, has connection with the steering apparatus 93, through the link 94). Therefore, the steering wheels of the vehicle will be turned to divert its course away from the obstruction, as in the former cases. This one distinction will be noted, however, that in the present case, the effective connection between the bumper and the steering gear is one which resists a pull only, and not a thrust as was the case in the former modifications.

By reason of the peculiar connection between the bumper and the steering apparatus, the bumper may be moved rearwardly bodily without affecting the steering gear because of the fact that the sections 88 of the connecting links may move rearwardly independently of the sections 89 thereof. Therefore, in the case of a "head on" collision with an obstruction, the bumper 80 will be moved rearwardly and, through the rod 77, will remove the block 76 from between the contact spring 75 and break the driving circuit of the vehicle. At the same time, the electro-magnet 72 will be deënergized, and the brake shoe 67 applied to the drum 66 by means of the spring 71 thereby to instantly stop the progress of the vehicle.

I have employed the foregoing embodiments as illustrative of the principles of my invention, and do not limit myself to the structural details thereof further than is required by the terms of the following claims, and is rendered necessary by the state of the prior art.

Having thus described my invention, what I claim is:—

1. The combination with a vehicle, of a bumper located beyond and swingably connected to one end of the vehicle, a spring for maintaining the bumper in normal position with respect to the vehicle, and operative connections between the bumper and the steering gear of the vehicle.

2. The combination with a vehicle, of a bumper located beyond and swingably connected to one end of the vehicle, a spring for maintaining the bumper in normal position with respect to the vehicle, means of adjustment for obtaining and retaining such normal position, and adjustable operative connections between the bumper and the steering gear of the vehicle.

3. The combination with a vehicle, of a bumper located beyond one end of the vehicle, a spring connecting the bumper to the vehicle whereby the bumper may move toward and from the vehicle and oscillate with respect thereto, means of adjustment between the spring and bumper so that the angular relation of the bumper to the vehicle may be altered, and adjustable connections between the bumper and the steering gear of the vehicle.

4. The combination with a vehicle, of a bumper located beyond one end of the vehicle, a spring yieldingly connecting the bumper to the vehicle whereby the bumper may move toward and from the vehicle and oscillate with respect thereto, means of adjustment between the spring and bumper so that the angular relation of the bumper to the vehicle may be altered, adjustable connections between the bumper and the steering gear of the vehicle, and stops for limiting the movement of the bumper.

5. The combination with a vehicle of the class described, of a pair of brackets that are arranged for attachment to the forward end of the vehicle frame, a semi-elliptic spring having one of its ends attached to each of the brackets, a bumper extending across the front of the vehicle and having its central portions connected to said spring, means for adjusting the angle between the spring and bumper, and an adjustable link connecting one end of the bumper with one of the steering knuckles of the vehicle.

6. The combination with a vehicle of the class described, of a pair of brackets that are arranged for attachment to the forward ends of the vehicle frame, a semi-elliptic spring having one of its ends attached to each of the brackets, a bumper extending across the front of the vehicle and having its central portions connected to said spring, means for adjusting the angle between the spring and bumper, an adjustable link connecting one end of the bumper with one of the steering knuckles of the vehicle, and stops carried by the aforesaid brackets for limiting the movement of the bumper with respect to the vehicle frame.

7. The combination with a vehicle of the class described, of a pair of brackets that are arranged for attachment to the forward end of the vehicle frame, a semi-elliptic spring having one of its ends attached to each of the brackets, a bumper extending across the front of the vehicle and having its central portions connected to said spring, and an adjustable link connecting one end of the bumper with one of the steering knuckles of the vehicle.

8. The combination with a vehicle of the class described, of a pair of brackets that are arranged for attachment to the forward end of the vehicle frame, a semi-elliptic spring having one of its ends attached to each of the brackets, a bumper extending across the front of the vehicle and having its central portions connected to said spring, and stops carried by the aforesaid brackets for limiting the movement of the bumper.

9. The combination with a vehicle, of a semi-elliptic spring having its ends attached to the vehicle, and a bumper having its central portion connected to the corresponding portion of the spring wherefore the bumper may rock with respect to the spring.

10. The combination with a vehicle, of automatic steering apparatus therefor comprising a bumper located beyond and swingably connected to one end of the vehicle, connections between said bumper and the steering mechanism of the vehicle, and a spring tending to maintain the bumper and consequently the steering mechanism in normal position.

11. The combination of a vehicle, a bumper, a semi-elliptic spring having its ends attached to one and its central portion attached to the other, the bumper and spring being spaced apart except where connected, and means for adjusting the angular relation between the spring and the element to which its central portion is attached.

In testimony whereof, I hereunto affix my signature in the presence of two witnesses.

LEE S. CHADWICK.

Witnesses:
 HUGH B. McGILL,
 BRENNAN B. WEST.